US011688871B2

United States Patent
Ji et al.

(10) Patent No.: US 11,688,871 B2
(45) Date of Patent: Jun. 27, 2023

(54) ELECTRODE FOR MEMBRANE-ELECTRODE ASSEMBLY, METHOD OF MANUFACTURING SAME AND MEMBRANE-ELECTRODE ASSEMBLY USING SAME

(71) Applicants: Hyundai Motor Company, Seoul (KR); Kia Motors Corporation, Seoul (KR)

(72) Inventors: Byeong Gab Ji, Gyeonggi-do (KR); Su Won Seol, Gyeonggi-do (KR); Dong Hwan Yoon, Gyeonggi-do (KR); Kook Il Han, Gyeonggi-do (KR); Yoon Hwan Cho, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 304 days.

(21) Appl. No.: 17/101,576

(22) Filed: Nov. 23, 2020

(65) Prior Publication Data

US 2021/0313609 A1 Oct. 7, 2021

(30) Foreign Application Priority Data

Apr. 3, 2020 (KR) .................. 10-2020-0040866

(51) Int. Cl.
*H01M 8/1004* (2016.01)
*H01M 4/88* (2006.01)
*H01M 4/90* (2006.01)

(52) U.S. Cl.
CPC ....... *H01M 8/1004* (2013.01); *H01M 4/8828* (2013.01); *H01M 4/8882* (2013.01); *H01M 4/8892* (2013.01); *H01M 4/9008* (2013.01)

(58) Field of Classification Search
CPC ............ H01M 4/8828; H01M 4/8882; H01M 4/8892; H01M 4/9008; H01M 4/9075; H01M 4/9083; H01M 8/1004
See application file for complete search history.

(56) References Cited

U.S. PATENT DOCUMENTS

2011/0020726 A1* 1/2011 Matsuoka ............. H01M 4/925
429/480

FOREIGN PATENT DOCUMENTS

| JP | 2004-281305 | * | 10/2004 |
| JP | 2005-197195 | A | 7/2005 |
| JP | 4300855 | B2 | 7/2009 |
| JP | 2012-043612 | * | 3/2012 |
| JP | 2012-243431 | * | 12/2012 |
| JP | 5526385 | B2 | 6/2014 |

(Continued)

OTHER PUBLICATIONS

English translation of JP Publication 2012-243431, dated Dec. 2012.*

(Continued)

*Primary Examiner* — Brittany L Raymond
(74) *Attorney, Agent, or Firm* — Fox Rothschild LLP

(57) ABSTRACT

Disclosed are an electrode for a membrane-electrode assembly, a method of manufacturing the same and a membrane-electrode assembly using the same. The electrode may include the pores and pore density around a catalyst contained in the electrode may be selectively increased using a thermally decomposable chemical blowing agent, thereby improving mass transfer through the catalyst.

18 Claims, 2 Drawing Sheets

(56) References Cited

FOREIGN PATENT DOCUMENTS

KR      10-0814852 B1    3/2008
KR      10-0969029 B1    7/2010

OTHER PUBLICATIONS

English translation of JP Publication 2012-043612, dated Mar. 2012.*

English translation of JP Publication 2004-281305, dated Oct. 2004.*

* cited by examiner

ELECTRODE FOR MEMBRANE-ELECTRODE ASSEMBLY, METHOD OF MANUFACTURING SAME AND MEMBRANE-ELECTRODE ASSEMBLY USING SAME

CROSS REFERENCE TO RELATED APPLICATION

The present application claims priority based on Korean Patent Application No. 10-2020-0040866, filed on Apr. 3, 2020, the entire content of which is incorporated herein for all purposes by this reference.

TECHNICAL FIELD

The present invention relates to an electrode for a membrane-electrode assembly, a method of manufacturing the same and a membrane-electrode assembly using the same. The electrode for a membrane-electrode assembly may include pores, and the pore density around a catalyst contained in the electrode may be selectively increased using a thermally decomposable chemical blowing agent so as to improve mass transfer through the catalyst.

BACKGROUND OF THE INVENTION

A fuel cell is based on the principle whereby electricity is generated using external hydrogen and oxygen gas. For example, the oxygen gas is supplied from the outside to the surface of a catalyst contained in the oxygen electrode of the fuel cell, collides with the catalyst, and simultaneously reacts with protons and electrons to generate water. When this generated water is not quickly discharged from the oxygen electrode, the movement of newly introduced oxygen gas is impeded, and ultimately, a problem of interference with the chemical reaction in the fuel cell occurs.

Due to the above problem, it may be desirable for the water generated at the oxygen electrode of the fuel cell to be efficiently discharged. Moreover, it is highly desirable in terms of fuel cell performance for external oxygen gas to efficiently move to the catalyst surface.

In the related art, many attempts have recently been made to improve mass transfer by forming pores in the oxygen electrode of the fuel cell, but the positions at which the pores are formed in the oxygen electrode are randomly determined, undesirably deteriorating practicality and effectiveness.

For example, a fuel cell including an air-permeable porous electrode, in which a method of forming pores in an electrode using a blowing agent has been proposed. However, since the pores are randomly formed rather than being selectively located at the position at which the chemical reaction substantially occurs, the efficiency thereof is very poor.

SUMMARY

In one preferred aspects, provided is a method of selectively controlling the position of pores in the electrode of a fuel cell.

In one preferred aspect, provided is a method of efficiently discharging water generated in the electrode of a fuel cell.

In another preferred aspect, provided is a method of efficiently introducing external gas to the surface of a catalyst contained in the electrode of a fuel cell.

The objectives of the present invention are not limited to the foregoing, and will be able to be clearly understood through the following description and to be realized by the means described in the claims and combinations thereof.

In an aspect, provided is a method of manufacturing an electrode for a membrane-electrode assembly. The method may include: preparing a catalyst composite material including a catalyst, a blowing agent and a first ionomer, preparing a catalyst slurry including the catalyst composite material, a second ionomer, a solvent, and applying the catalyst slurry on a substrate. In certain aspects, after the applying, the catalyst slurry is suitably dried.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The first ionomer and second ionomer may be the same or different type. For example, if the first and second ionomers are different, the first ionomer and the second ionomer have different electrical conductivity, e.g., by containing different pendant groups, by at least 5, 10, 20, 25, 30, 35, 40, 45, 60, 70, 80 or 90% therebetween. Alternatively, if the first and second ionomers are different, the first ionomer and the second ionomer have different viscosity, e.g., by containing different pendant groups, by at least 5, 10, 20, 25, 30, 35, 40, 45, 60, 70, 80 or 90% therebetween.

The term "blowing agent" as used herein refers to a compound or substance that can create a foam (cellular) structure in a matrix material (e.g., polymers, plastics, and metals or alloy) before that matrix material solidifies or hardens, for example, when the matrix material is in liquid phase. In certain embodiments, the foam structure may include plurality of shapes of pores (e.g., circular, or non-circular), holes, cavity (e.g., microcavity), labyrinth, channel or the like, whether formed uniformly or without regularity. Exemplary blowing agent can generate gas (e.g., air bubbles, carbon dioxide, oxygen gas or hydrogen gas) as being included or incorporated in the matrix material such that the gas can create empty space entrapped in the matrix and constitute the foam structure. The gas may be released, for example, by chemical reaction or thermal decomposition of the blowing agent, during or after hardening or solidifying process (e.g., curing) of the matrix. In certain embodiments, preferred exemplary blowing agent may be included in the uncured polymer or resin. Before or at the time of the polymer or the resin being hardened (e.g., cured), the blowing agent may generate gaseous material and form the cellular foaming structure.

The catalyst may include catalyst particles and a support supporting the catalyst particles.

The blowing agent may include a thermally decomposable chemical blowing agent that is thermally decomposed at a temperature of 120° C. or greater.

The blowing agent may include one or more selected from the group consisting of azobisisobutyronitrile (AIBN), p-toluenesulfonyl hydrazide (TSH), oxybisbenzenesulfonyl hydrazide (OBSH), and 1,1'-azobiscyclohexanecarbonitrile (ACHN).

The catalyst composite material may include the catalyst and a coating layer formed on all or part of the surface of the catalyst, and the coating layer may include the first ionomer and the blowing agent.

The coating layer may include an amount of about 10 wt % to 90 wt % of the first ionomer and an amount of about 10 wt % to 90 wt % of the blowing agent based on the total weight of the coating layer.

The blowing agent may be adhered via the first ionomer and may be contained in the coating layer.

The catalyst composite material may include the blowing agent in an amount of about 0.1 to 10 parts by weight based on 100 parts by weight of the catalyst, and the catalyst composite material may include the first ionomer in an amount of about 5 to 15 parts by weight based on 100 parts by weight of the catalyst.

The catalyst composite material may be prepared at a temperature of about 60° C. or less.

The catalyst composite material may be prepared using a ball mill or a twin-screw extruder.

The ball mill may rotate at a rate of about 100 rpm to 500 rpm for 30 min or greater, and the twin-screw extruder may rotate at a rate of about 10 rpm to 120 rpm for about 60 min or greater.

The method may further include drying the catalyst composite material after preparing the catalyst composite material, in which the temperature at which the catalyst composite material is dried may be less than a temperature at which the blowing agent is thermally decomposed.

When preparing a catalyst layer, the temperature at which the catalyst slurry is dried may be greater than a temperature at which the blowing agent is thermally decomposed.

In the preparing the catalyst slurry, the catalyst slurry may include the second ionomer in an amount of about 10 parts by weight to 80 parts by weight based on 100 parts by weight of the catalyst composite material.

In an aspect, provided is an electrode for a membrane-electrode assembly manufactured by the method described herein and including a catalyst composite material and a second ionomer, in which the catalyst composite material includes at least one of a blowing agent or pores formed by thermally decomposing the blowing agent.

In as aspect, provided is a method of manufacturing a membrane-electrode assembly including thermally compressing the above electrode on one or both surfaces of an electrolyte membrane.

The blowing agent may be thermally decomposed through thermal compression.

Also, in an aspect, provided is a membrane-electrode assembly manufactured by the method described herein and including an electrolyte membrane and an electrode provided on the surface of the electrolyte membrane, the electrode including a first ionomer, a second ionomer and a catalyst.

The electrode of the membrane-electrode assembly may include pores, and portions of the pores may be in direct contact with the catalyst.

The proportion of pores that are in contact with the catalyst may be about 1% to 30% based on 100% of the total pores in the electrode.

According to various exemplary embodiments of the present invention, the method may selectively control the position of pores in the electrode of a fuel cell.

According to various exemplary embodiments of the present invention, the method may efficiently discharge water generated in the electrode of a fuel cell.

According to various exemplary embodiments of the present invention, the method may efficiently introduce external gas to the surface of a catalyst contained in the electrode of a fuel cell.

The effects of the present invention are not limited to the foregoing, and should be understood to include all effects that can be reasonably anticipated from the following description.

Other aspects of the invention are disclosed infra.

DETAILED DESCRIPTION

Figure 1:
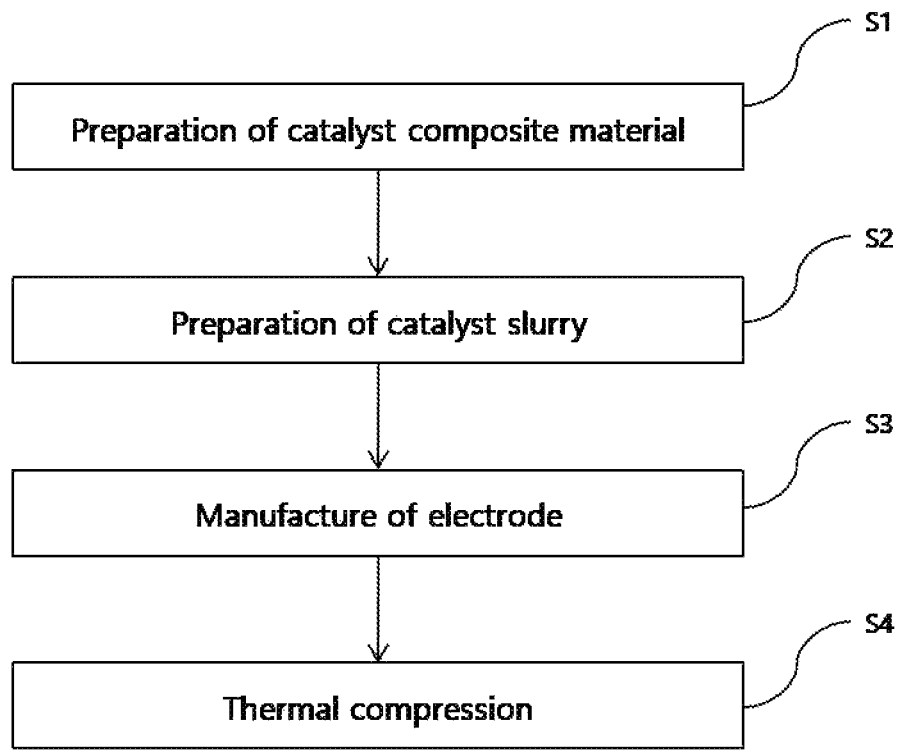
FIG. 1 shows an exemplary process of manufacturing an exemplary electrode for an exemplary membrane-electrode assembly and an exemplary process of manufacturing an exemplary membrane-electrode assembly according to an exemplary embodiment of the present invention.

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention pertains to an electrode for a membrane-electrode assembly, a method of manufacturing the same, a membrane-electrode assembly including the electrode for a membrane-electrode assembly and a method of manufacturing the same. In particular, the method may selectively increase the pore density around a catalyst contained in the electrode using a thermally decomposable chemical blowing agent.

FIG. 1 is an exemplary flowchart showing an exemplary process of manufacturing the electrode for an exemplary membrane-electrode assembly and an exemplary process of manufacturing the membrane-electrode assembly according to an exemplary embodiment of the present invention. Hereinafter, the manufacturing method of the present invention is described in detail with reference to FIG. 1, and the electrode for a membrane-electrode assembly and the membrane-electrode assembly according to the present invention are described with reference to FIGS. 2 to 4.

Method of Manufacturing Electrode for Membrane-Electrode Assembly (S1, S2, S3)

The method of manufacturing an electrode for a membrane-electrode assembly according to an exemplary embodiment of the present invention includes: preparing a catalyst composite material including, e.g., by mixing, a catalyst, a blowing agent and a first ionomer, preparing a catalyst slurry including the catalyst composite material, a second ionomer, and a solvent, e.g., by adding the catalyst composite material and the second ionomer to the solvent, and applying the catalyst slurry on a substrate and drying the catalyst slurry.

Preparing Catalyst Composite Material (S1)

A catalyst composite material may be prepared by mixing a catalyst, a blowing agent and a first ionomer. The catalyst, the blowing agent and the first ionomer may be mixed using a mixer, thus preparing a catalyst composite material including the catalyst and a coating layer formed on the surface of the catalyst.

The catalyst may include catalyst particles and a support supporting the catalyst particles, and the catalyst used in the present invention is not particularly limited, so long as it is typically useful in the fuel cell field.

The blowing agent of the present invention may be bonded or adsorbed through interaction with the support, and for example, may include a thermally decomposable chemical blowing agent.

Preferably, the thermally decomposable chemical blowing agent may be thermally decomposed at a temperature of about 120° C. or greater and is thus foamed. The thermally decomposable chemical blowing agent may be thermally decomposed at a temperature of about 120° C. to 200° C. and may thus be foamed. Here, when the thermally decomposable chemical blowing agent is thermally decomposed at a temperature less than about 120° C., foaming may occur in undesired steps. On the other hand, when the thermally decomposable chemical blowing agent is thermally decomposed at a temperature greater than about 200° C., degradation of the catalyst and the ionomer may occur.

The blowing agent may include one or more selected from the group consisting of azobisisobutyronitrile (AIBN), p-toluenesulfonyl hydrazide (TSH), oxybisbenzenesulfonyl hydrazide (OBSH), and 1,1'-azobiscyclohexanecarbonitrile (ACHN). Preferably, the blowing agent may include AIBN and ACHN having an azo functional group.

The first ionomer o may include one or more selected from the group consisting of polysulfone-based resin, polyether-ketone-based resin, polyether-based resin, polyester-based resin, polybenzimidazole-based resin and Nafion. The kind of the first ionomer is not particularly limited, so long as it is helpful for attaching and adsorbing the blowing agent to the catalyst.

The catalyst, the blowing agent and the first ionomer may be placed in a mixer and mixed, thus preparing a catalyst composite material. For example, the catalyst, the blowing agent and the first ionomer may be placed in a mixer to afford a catalyst composite material.

Mixing may be preferably performed at a temperature of about 25° C. to 60° C. so the mixing may prevent the blowing agent from thermally decomposing and foaming during mixing. The mixer is not particularly limited, so long as it is a device capable of causing a mechanochemical reaction, and preferably, the mixer is a ball mill or a twin-screw extruder.

The ball mill used for the mixing process may rotate at about 100 rpm to 500 rpm for about 30 min or greater. Here, the diameter of the balls in the ball mill may suitably be about 0.1 to 120 mm.

The twin-screw extruder used for the mixing process may rotate at about 10 rpm to 120 rpm for about 60 min or greater.

The amount of the blowing agent that is placed in the mixer may be about 0.1 to 10 parts by weight based on 100 parts by weight of the catalyst. When the amount of the blowing agent is less than about 0.1 parts by weight, pores may not be sufficiently formed. On the other hand, when the amount thereof is greater than about 10 parts by weight, the movement path of electrons may be interrupted due to the excessive pore formation, or the electrode durability may decrease.

The amount of the first ionomer that is placed in the mixer may be about 5 to 15 parts by weight based on 100 parts by weight of the catalyst. When the amount of the first ionomer is less than about 5 parts by weight, adhesion of the catalyst and the blowing agent may decrease. On the other hand, when the amount thereof is greater than about 15 parts by weight, bonding of the catalyst and the blowing agent may be impeded.

Figure 2:
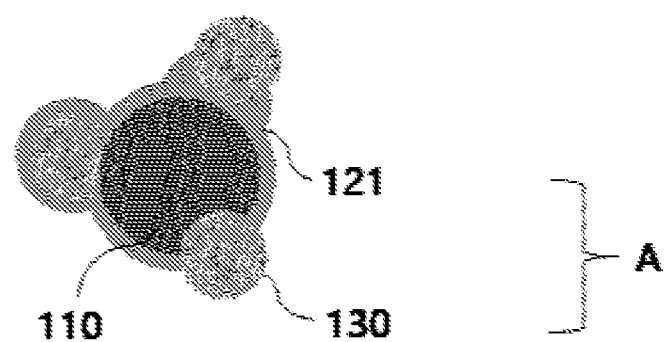
FIG. 2 shows an exemplary catalyst composite material according to an exemplary embodiment of the present invention.

FIG. 2 schematically shows an exemplary catalyst composite material prepared through mixing. As shown in FIG. 2, the catalyst composite material prepared according to an exemplary embodiment of the present invention includes an exemplary catalyst and an exemplary coating layer formed on all or part of the surface of the catalyst.

The coating layer may include the blowing agent and the first ionomer, and the blowing agent may be directly attached to the catalyst, or may be adhered via the first ionomer.

The coating layer may suitably include an amount of about 10 wt % to 90 wt % of the first ionomer and an amount of about 10 wt % to 90 wt % of the blowing agent based on the total weight of the coating layer.

The catalyst composite material may be dried performed after preparing the catalyst composite material, which may strengthen the bonding of the blowing agent and the catalyst of the present invention. The temperature at which the catalyst composite material is dried may preferably be less than the temperature at which the blowing agent is thermally decomposed.

Preparing Catalyst Slurry (S2)

A catalyst slurry may prepared by adding the catalyst composite material and a second ionomer to a solvent.

The second ionomer may be preferably the same kind of ionomer as the first ionomer, but different kinds of ionomers may be used, as necessary, and there is no particular limitation thereto.

The amount of the second ionomer that is added to the solvent may be about 10 parts by weight to 80 parts by weight based on 100 parts by weight of the catalyst composite material.

The solvent may include one or more selected from the group consisting of distilled water, ethanol, propanol, butanol, and ethylene glycol.

Manufacturing Electrode (S3)

An electrode may be manufactured by applying the catalyst slurry on a substrate and drying the same. For example, the catalyst slurry including the catalyst composite material, the second ionomer and the solvent may be applied on a release sheet, serving as a substrate, using a coating device and is then dried. The electrode may be manufactured by applying the catalyst slurry on a substrate, or the electrode may be manufactured by directly applying the catalyst slurry on an electrolyte membrane, as necessary.

Examples of the coating device may include a spray-coating device, a bar-coating device, and a slot-die-coating device. Here, the coating device and method may be used without limitation, so long as they are able to manufacture the electrode by applying the catalyst slurry in a typical fuel cell field.

The drying may be performed at a temperature of about 50 to 200° C. for about 10 min to 120 min.

The drying may be conducted in order to remove the solvent from the catalyst slurry. In addition thereto, drying may also be included in the blowing process in the present invention.

Figure 3:
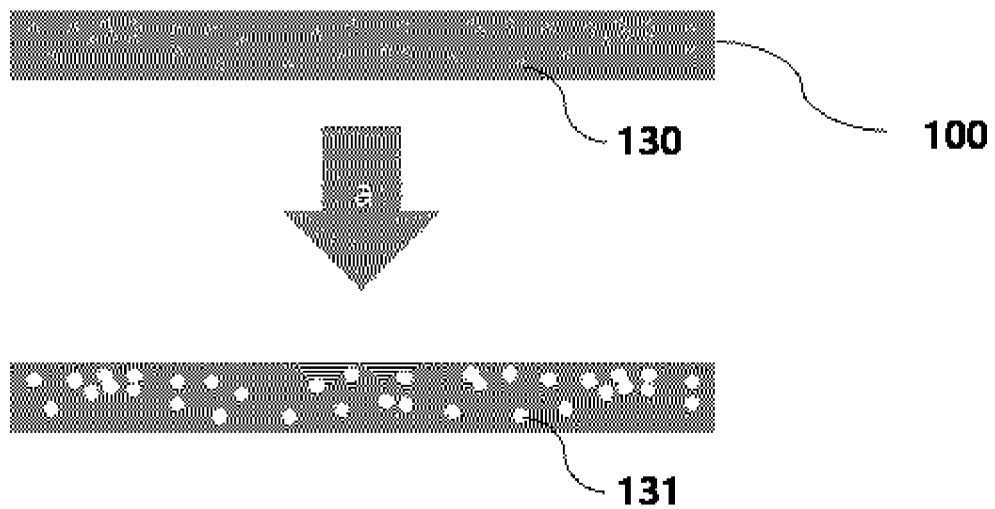
FIG. 3 shows an exemplary process of foaming an exemplary blowing agent contained in an exemplary electrode of the present invention.

The blowing agent may not be thermally decomposed by drying in the step of manufacturing the electrode, but drying may be performed so that the blowing agent may be thermally decomposed and foamed, as necessary. FIG. 3 schematically shows an exemplary blowing process. The blowing agent contained in the electrode may be foamed by drying, and artificial pores are formed in place of the blowing agent in the portion in which the blowing agent was located. For example, part of the blowing agent may be foamed, or all thereof may be foamed, as shown in FIG. 3. When the blowing agent is not foamed by drying, the drying temperature has to be less than the lower limit of the thermal decomposition temperature range of the blowing agent, and when the blowing agent is foamed by drying, the drying temperature has to be equal to or higher than the lower limit of the thermal decomposition temperature range of the blowing agent.

Electrode for Membrane-Electrode Assembly

The electrode for a membrane-electrode assembly may be manufactured by the method described herein. The electrode may include a catalyst composite material and a second ionomer, and the catalyst composite material includes at least one of a blowing agent and artificial pores formed by thermally decomposing the blowing agent.

The blowing agent may be foamed in the drying step, and thus may be converted into pores (artificial pores), or may be included in the electrode without foaming in the drying step, which may be selected according to need.

Method of Manufacturing Membrane-Electrode Assembly (S1, S2, S3, S4)

The electrode for a membrane-electrode assembly and an electrolyte membrane may be prepared, and the electrode may be thermally compressed on one or both surfaces of the electrolyte membrane, thus manufacturing a membrane-electrode assembly (S4).

The blowing agent that is not foamed in the step of manufacturing the electrode may be thoroughly thermally decomposed and foamed by thermal compression. The thermal compression may be preferably performed at a temperature of about 100° C. to 250° C. for about 2 min to 30 min.

Membrane-Electrode Assembly

The membrane-electrode assembly may include an electrolyte membrane and an electrode provided on the surface of the electrolyte membrane.

The electrode may include a first ionomer, a second ionomer and a catalyst, pores being included in the catalyst.

The pores may fundamentally include natural pores, which are naturally formed in the catalyst particles, the support and the catalyst composite material and in between the same, and may further include artificial pores formed by foaming the blowing agent around the catalyst.

Figure 4:
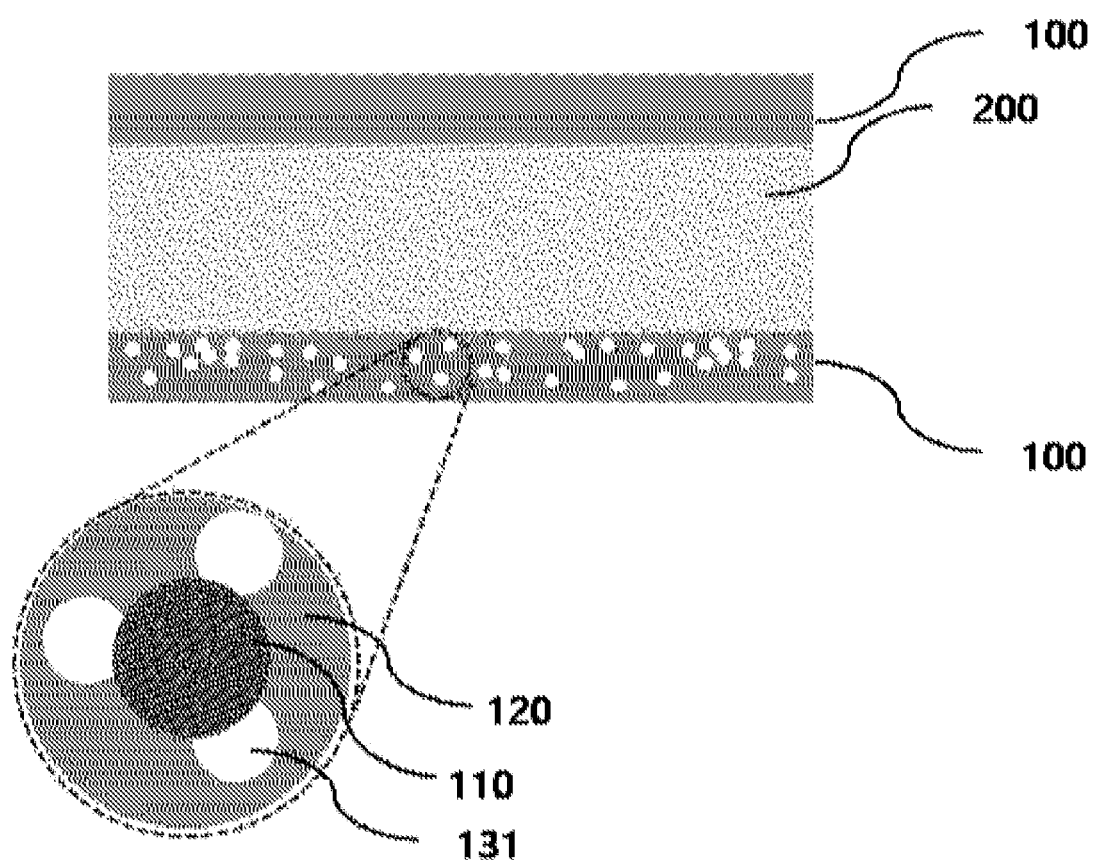
FIG. 4 shows an exemplary membrane-electrode assembly and an exemplary electrode according to an exemplary embodiment of the present invention.

FIG. 4 shows the membrane-electrode assembly including an electrode having pores formed therein by thoroughly foaming the blowing agent. As shown in FIG. 4, the electrode may preferably include pores, and some of the pores may be in direct contact with the catalyst. The proportion of the pores (artificial pores) that are in contact with the catalyst may be about 1% to 30% based on 100% of the total pores in the electrode.

The natural pores have a diameter of about 1 μm or greater, and the artificial pores suitably may have a diameter of about 2 to 500 nm, or particularly about 2 to 100 nm.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an electrode for a membrane-electrode assembly, comprising:
   preparing a catalyst composite material comprising a catalyst, a blowing agent and a first ionomer;
   preparing a catalyst slurry comprising the catalyst composite material, a second ionomer, and a solvent; and
   applying the catalyst slurry on a substrate,
   wherein the catalyst composite material comprises the catalyst and a coating layer formed on all or part of a surface of the catalyst, and
   the coating layer comprises the first ionomer and the blowing agent.

2. The method of claim 1, wherein the catalyst comprises catalyst particles and a support supporting the catalyst particles.

3. The method of claim 1, wherein the blowing agent comprises a thermally decomposable chemical blowing agent that is thermally decomposed at a temperature of 120° C. or greater.

4. The method of claim 1, wherein the blowing agent comprises one or more selected from the group consisting of azobisisobutyronitrile (AIBN), p-toluenesulfonyl hydrazide (TSH), oxybisbenzenesulfonyl hydrazide (OBSH), and 1,1'-azobiscyclohexanecarbonitrile (ACHN).

5. The method of claim 1, wherein the coating layer comprises an amount of about 10 wt % to 90 wt % of the first ionomer and an amount of about 10 wt % to 90 wt % of the blowing agent based on the total weight of the coating layer.

6. The method of claim 1, wherein the catalyst composite material comprises the blowing agent in an amount of about 0.1 to 10 parts by weight based on 100 parts by weight of the catalyst, and the first ionomer in an amount of about 5 to 15 parts by weight based on 100 parts by weight of the catalyst.

7. The method of claim 1, wherein the catalyst composite material is prepared at a temperature of about 60° C. or less.

8. The method of claim 1, wherein the catalyst composite material is prepared using a ball mill or a twin-screw extruder.

9. The method of claim 8, wherein the ball mill rotates at a rate of about 100 rpm to 500 rpm for about 30 min or greater, or
   the twin-screw extruder rotates at a rate of about 10 rpm to 120 rpm for about 60 min or greater.

10. The method of claim 1, further comprising drying the catalyst composite material, after preparing the catalyst composite material,
    wherein a temperature at which the catalyst composite material is dried is less than a temperature at which the blowing agent is thermally decomposed.

11. The method of claim 1, wherein when preparing the catalyst slurry, a temperature at which the catalyst slurry is dried is greater than a temperature at which the blowing agent is thermally decomposed.

12. The method of claim 1, wherein in the preparing the catalyst slurry, the catalyst slurry comprises the second ionomer in an amount of about 10 parts by weight to 80 parts by weight based on 100 parts by weight of the catalyst composite material.

13. An electrode for a membrane-electrode assembly manufactured by a method of claim 1, comprising a catalyst composite material and a second ionomer,
    wherein the catalyst composite material comprises at least one of a blowing agent or pores formed by thermally decomposing the blowing agent.

14. A method of manufacturing a membrane-electrode assembly comprising thermally compressing an electrode of claim 13 on one or both surfaces of an electrolyte membrane.

15. The method of claim 14, wherein the blowing agent is thermally decomposed through thermal compression.

16. A membrane-electrode assembly manufactured by a method of claim 14 and comprising:
    an electrolyte membrane; and
    an electrode provided on a surface of the electrolyte membrane,
    wherein the electrode comprises a first ionomer, a second ionomer and a catalyst.

17. The membrane-electrode assembly of claim 16, wherein the electrode of the membrane-electrode assembly comprises pores, and portions of the pores are in direct contact with the catalyst.

18. The membrane-electrode assembly of claim 17, wherein a proportion of the pores that are in contact with the catalyst is about 1% to 30% based on 100% of the total pores in the electrode.

* * * * *